(12) United States Patent
Li et al.

(10) Patent No.: US 11,949,193 B2
(45) Date of Patent: Apr. 2, 2024

(54) LEAKAGE CURRENT PROTECTION DEVICE WITH ILLUMINATION FUNCTION

(71) Applicant: Chengli Li, Suzhou (CN)

(72) Inventors: Chengli Li, Suzhou (CN); Xiaoming Zhang, Suzhou (CN); Shengyun Nie, Suzhou (CN)

(73) Assignee: Chengli Li, Suzhou (CN)

( * ) Notice: Subject to any disclaimer, the term of this patent is extended or adjusted under 35 U.S.C. 154(b) by 521 days.

(21) Appl. No.: 17/368,813

(22) Filed: Jul. 6, 2021

(65) Prior Publication Data

US 2022/0416484 A1    Dec. 29, 2022

(30) Foreign Application Priority Data

Jun. 25, 2021   (CN) .......................... 202110709236.2
Jun. 25, 2021   (CN) .......................... 202121424496.7

(51) Int. Cl.
*H01R 13/717*   (2006.01)
*H01R 13/66*    (2006.01)

(52) U.S. Cl.
CPC ..... *H01R 13/7175* (2013.01); *H01R 13/6683* (2013.01); *H01R 13/717* (2013.01)

(58) Field of Classification Search
CPC ............ H01R 13/7175; H01R 13/6683; H01R 13/717
See application file for complete search history.

(56) References Cited

U.S. PATENT DOCUMENTS

2018/0166242 A1*  6/2018  Li ........................ H01H 83/144

FOREIGN PATENT DOCUMENTS

CN           216902772 U   *   7/2022

* cited by examiner

*Primary Examiner* — Joseph L Williams
(74) *Attorney, Agent, or Firm* — Chen Yoshimura LLP

(57) ABSTRACT

A leakage current protection device with an illumination function, including a shell, a movement assembly in the shell, power input and output assemblies coupled to the movement assembly, and an illumination assembly disposed inside the shell, which includes: an illumination control board electrically coupled to the power input or output assembly; a sensing unit coupled to the illumination control board and configured to sense an ambient condition outside the shell to generate a sensing output signal; a light emitting unit coupled to the control board, and controlled by the control board to turn on or off in response to the sensing output signal; and a light guide unit, formed by an operating element partially protruding out of the shell and disposed adjacent the light emitting unit, configured to guide the illumination light emitted by the light emitting unit out of the shell. The device is convenient to use and compact.

9 Claims, 4 Drawing Sheets

LEAKAGE CURRENT PROTECTION DEVICE WITH ILLUMINATION FUNCTION

BACKGROUND OF THE INVENTION

Field of the Invention

This invention relates to electrical devices. More specifically, it relates to a leakage current protection device, and in particular, a leakage current protection device having an illumination function.

Description of Related Art

Leakage current protection devices are widely used in homes, in particular, in areas exposed to moisture (e.g., kitchen, bathroom, garage) and public places. Conventional power receptacles with leakage current protection devices only function to supply power. When the ambient environment is dark and not well lit, it is difficult to plug electrical plugs into the receptacles. Further, at night, after turning on lights, users need to wait for their eyes to adjust to the light before they can proceed to plug the electrical device into the receptacle. These make it inconvenient for the users.

To improve user experience, some existing leakage current protection devices are equipped with automatic night lights for illumination. However, the extra night lights increase the sizes of the receptacles, making them unsuitable in situations where space is limited, causing inconvenience for the user. Further, existing illumination devices cannot server to meet safety requirements for leakage current protection devices, e.g. real-time monitoring of the normal operation condition of the leakage current protection devices.

SUMMARY

Accordingly, an object of the present invention is to provide an improved leakage current protection device which, by incorporating an illumination function, provides convenience to the user, and can also provide real time indication of the working condition of the leakage current protection device, ensuring safety of the device.

In one aspect, the present invention provides a leakage current protection device with an illumination function, which includes: a shell; a movement assembly disposed in the shell; a power input assembly and a power output assembly coupled to the movement assembly; and an illumination assembly disposed inside the shell, including: an illumination control board, electrically coupled to the power input assembly or the power output assembly; a sensing unit, coupled to the illumination control board, and configured to sense an ambient condition outside of the shell to generate a sensing output signal; a light emitting unit, coupled to the illumination control board, wherein the illumination control board is configured to control the light emitting unit to turn on or off in response to the sensing output signal from the sensing unit; and a light guide unit, which is formed by an operating element partially protruding out of the shell and disposed adjacent the light emitting unit, configured to guide an illumination light emitted by the light emitting unit out of the shell.

Based on the above technical characteristics, the present invention may include any one or more of the embodiments below.

In some embodiments, the leakage current protection device further includes a reset assembly and a test assembly, wherein the operating element forming the light guide unit is a button of the reset assembly or the test assembly which partially protrudes out of the shell.

In some embodiments, the light guide unit is a test button of the test assembly, the test button including: a light transmitting key, which partially protrudes out of the shell to form an operating portion of the test button; a light reflecting platform, joined to the light transmitting key and including a test rod which is configured to engage a test plate of the test assembly, wherein at least the light transmitting key is formed of a light transmitting material.

In some embodiments, the light reflecting platform includes a diffuse-reflective inclined plane, wherein the inclined plane matches a shape of the light transmitting key and faces the light emitting unit, configured to diffuse-reflect the illumination light from the light emitting unit through the light transmitting key.

In some embodiments, the sensing unit includes a sensor coupled to the illumination control board, wherein the sensor is configured to sense at least one of a light signal, a sound signal, a wireless communication signal, and an infrared signal and generate a sensing output signal accordingly.

In some embodiments, the sensing unit further includes a sensing post which corresponds to the sensor and extends to an outer surface of the shell, wherein the shell includes a sensing opening and wherein the sensing post partially protrudes from the sensing opening.

In some embodiments, the leakage current protection device is a power receptable and includes a middle support frame, wherein the illumination control board is disposed on the middle support frame and electrically coupled to socket plates of the power output assembly.

In some embodiments, the socket plates include a hot socket plate and a neutral socket plate, the hot socket plate having a connection hole, the neutral socket plate having a power source contact plate, wherein the illumination control board includes another connection hole and a connection wire that connects the connection hole of the illumination control board to the connection hole of the hot socket plate, and wherein the illumination control board further includes a power source contact plate which contacts the power source contact plate of the neutral socket plate.

In some embodiments, the leakage current protection device further includes an isolation structure configured to isolate the illumination control board from the neutral socket plate, wherein the isolation structure includes an opening configured to allow the power source contact plate of the illumination control board and the power source contact plate of the neutral socket plate to physically contact each other.

The leakage current protection device according to embodiments of the resent invention provides a controllable (light-controlled, sound-controlled, wireless-controlled, etc.) illumination assembly, making it earlier to use in dark environments. By implementing the light guide unit as a part of an operating button on an outer surface of the shell, the overall size of the device is not increased, and can also indirectly inform the user of the working condition of the leakage current protection device, thereby ensuring safety. The leakage current protection device according to embodiments of the present invention is low cost, convenient to use, easy to assemble, easy to manufacture, and versatile.

BRIEF DESCRIPTION OF THE DRAWINGS

Preferred embodiments of the present invention are described with reference to the drawings. In these drawings, like reference symbols represent like features.

DETAILED DESCRIPTION OF PREFERRED EMBODIMENTS

Preferred embodiments of the present and their applications are described below. It should be understood that these descriptions describe embodiments of the present invention but do not limit the scope of the invention. When describing the various components, directional terms such as "up," "down," "top," "bottom" etc. are not absolute but are relative. These terms may correspond to the views in the various illustrations, and can change when the views or the relative positions of the components change.

In this disclosure, terms such as "connect", "couple", "link" etc. should be understood broadly; for example, they may be fixed connections, or removable or detachable connections, or integrally connected for integrally formed; they may be directly connected, or indirectly connected via intermediate parts. Those skilled in the relevant art can readily understand the meaning of these terms as used in this disclosure based on the specific description and context.

The embodiments described below use power supply receptacles as examples, but it should be understood that the invention is not limited to receptacles, and can apply to other types of leakage current protection devices.

Figure 1:
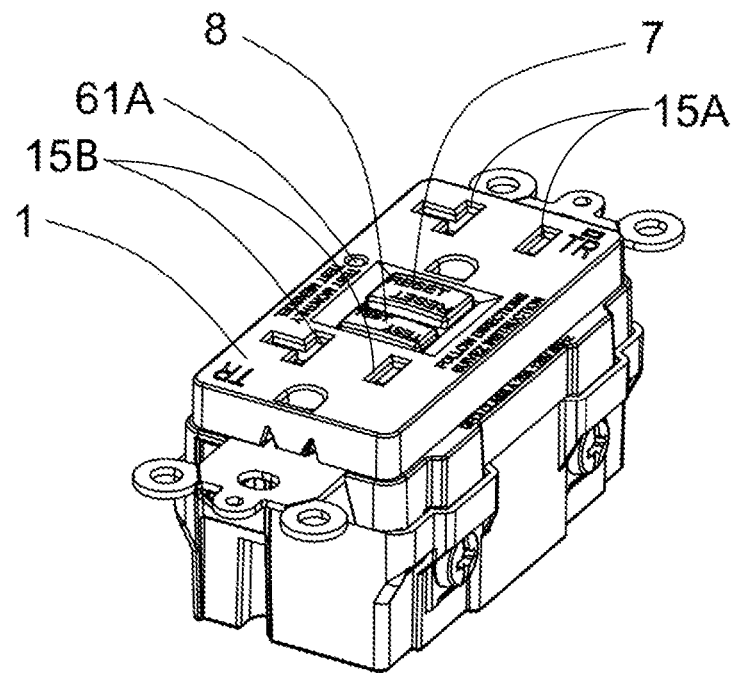
FIG. 1 is an exterior view of a leakage current protection device according to an embodiment of the present invention.
Figure 2:
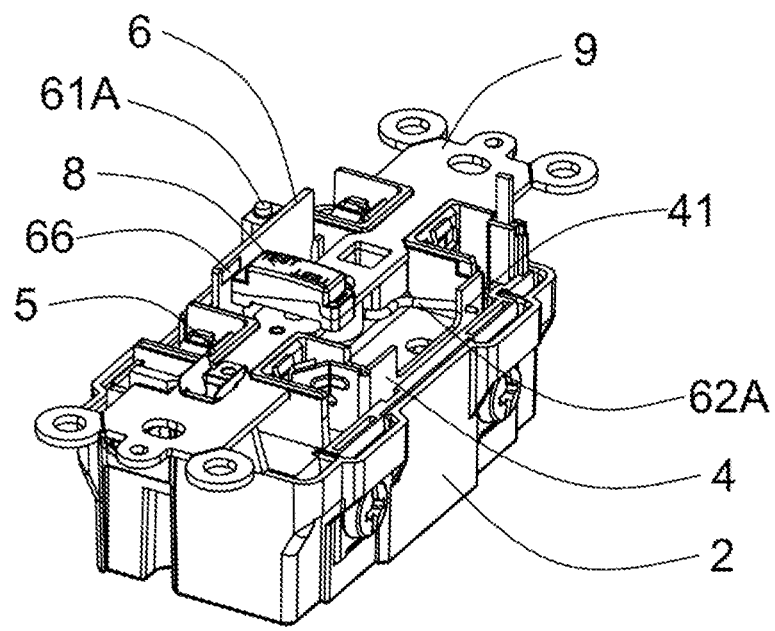
FIG. 2 illustrates the leakage current protection device of FIG. 1 after removing the top cover and the reset button.
Figure 3:
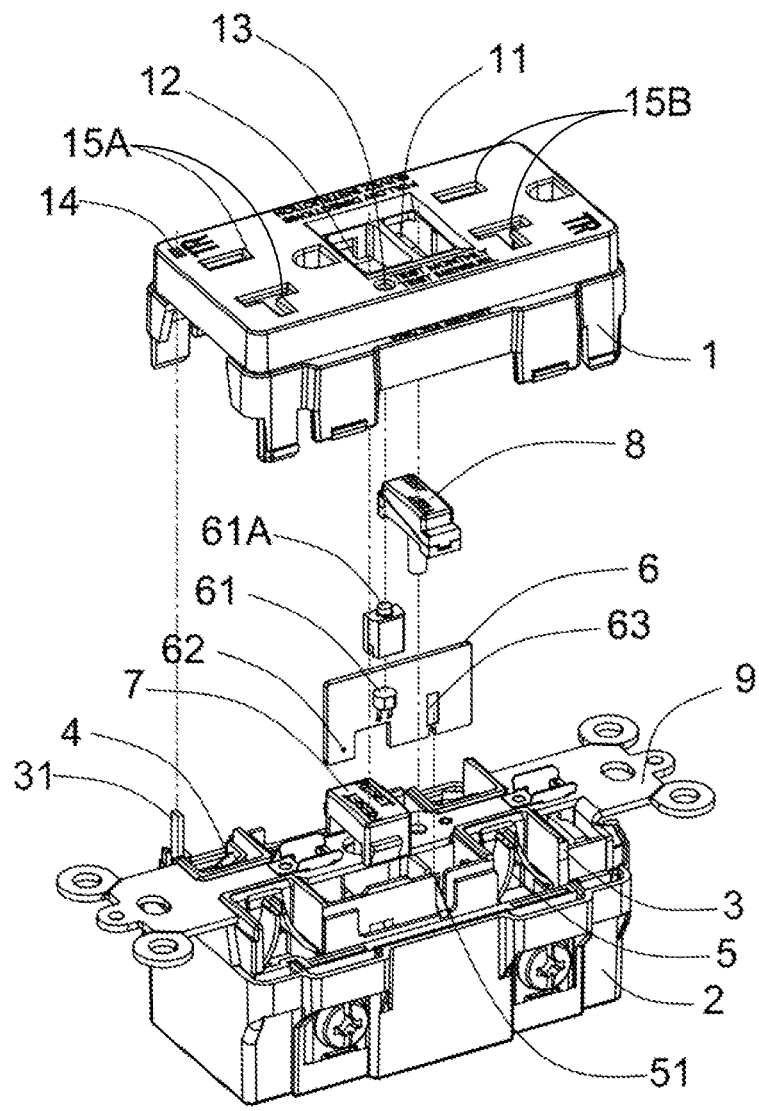
FIG. 3 is a partial exploded view of the leakage current protection device of FIG. 1, showing components of the illumination assembly.
Figure 4:
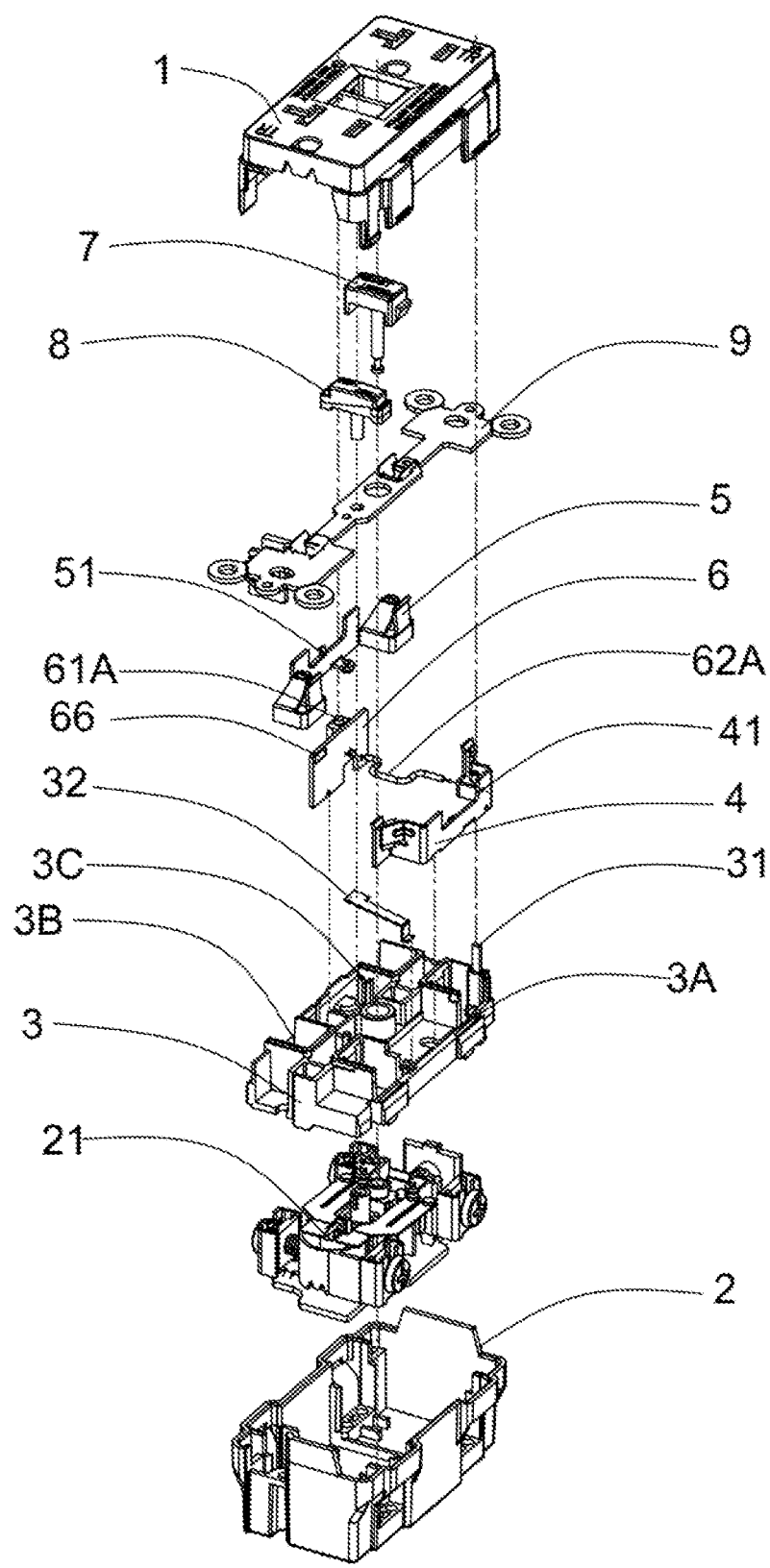
FIG. 4 is an exploded view of the leakage current protection device of FIG. 1.

FIGS. 1-4 illustrate a leakage current protection device according to an embodiment of the present invention. The leakage current protection device is a power supply receptacle, and includes a shell and a movement assembly disposed in the shell. The shell includes an upper cover 1 and a base 2 joined together by a snap structure. The upper cover 1 has output slots 15A and 15B, and a reset button opening 12 and a test button opening 11 respectively configured to allow the reset button 7 and test button 8 to partially protrude from the shell. As shown in FIG. 4, a middle support frame 3 and a ground frame 9 are disposed in the shell, and the movement assembly 21 is disposed between the middle support frame 3 and the base 2. The middle support frame 3 is disposed inside the base 2 and covers the movement assembly 21. The middle support frame 3 is configured to accommodate a hot socket plate 4, a neutral socket plate 5, the ground frame 9 and a test plate 32 on it; it has corresponding position limiting structures to securely position and hold each of these components.

The movement assembly 21 may have a structure similar to conventional leakage current protection devices, which includes a switch, a leakage current or other fault detection circuit, and a trip assembly that controls the switch to mechanically disconnect the power to the output assembly (the hot and neutral socket plates) in response to a fault being detected (i.e. trip). The reset button is a part of a reset assembly that engages the movement assembly, and can be depressed after the device trips so as to reset the device. The test button is a part of a test assembly, which is coupled to the leakage current or fault detection circuit, and can be depressed to test whether the leakage current protection device is functioning properly.

In some embodiments, the leakage current protection device may include power source indication function. As shown in FIG. 3, a light guide post 31 is disposed on the middle support frame 3, and configured to guide the light emitted by a light emitting component of the movement assembly to the surface of the upper cover 1. Correspondingly, the upper cover 1 has a power source indicator opening 14 that allows the light guide post 31 to protrude to the surface.

According to embodiments of the present invention, the leakage current protection device is provided with an illumination assembly, which can automatically sense the ambient brightness and to turn the illumination when the ambient brightness is low, making it convenient to use the power receptacle. Beneficially, the part of the illumination assembly is integrated with an operating element (button) at the outer surface of the shell, and does not increase the size of the receptacle.

In the embodiment shown in FIG. 2, the illumination assembly is disposed on the middle support frame 3 and is electrically coupled to the power output assembly (i.e. the socket plates). It should be understood that in alternative embodiments, the illumination assembly may be electrically coupled to the power input assembly.

More specifically, the illumination assembly includes an illumination control board 6, which is disposed on the middle support frame 3 and coupled to the hot socket plate 4 and the neutral socket plate 5. Referring to FIGS. 2-4 and 6, the middle support frame 3 includes a hot socket plate installation groove 3A and a neutral socket plate installation groove 3B, for respectively positioning and mounting the hot socket plate 4 and the neutral socket plate 5. The middle support frame 3 further includes a test plate receiving groove 3D to accommodate the test plate 32 of the test assembly, as well as an illumination control board installation groove 3C for positioning and mounting the illumination control board 6. In the illustrated embodiment, the illumination control board 6 is arranged adjacent to the neutral socket plate 5, and correspondingly, the middle support frame 3 has an isolation structure to isolate the illumination control board 6 from the neutral socket plate 5 to reduce undesirable interference. The isolation structure may be an isolation board 3E shown in FIG. 6, or other suitable structures, such as an isolation groove. It should be understood that in some embodiments, the illumination control board 6 may be arranged adjacent to the hot socket plate 4.

To electrically connect the illumination control board 6 with the hot socket plate 4 and neutral socket plate 5, and considering the structural layout and size factors, in some embodiments, the illumination control board 6 has a power source connection hole 62 (see FIG. 3), and is coupled to a connection hole 41 on the hot socket plate 4 by a connection wire 62A. The electrical coupling between the illumination control board 6 and neutral socket plate 5 may be by direct physical contact; for example, the illumination control board 6 may have a power source contact plate 63 which contacts a power source contact plate 51 on the neutral socket plate 5 to accomplished electrical coupling. In some embodiments, the isolation board 3E has an opening 3F to allow the power source contact plate 63 of the illumination control board 6 and the power source contact plate 51 of the neutral socket plate 5 to physically contact each other reliably. By using the above described structures, the illumination control board 6 can be powered by the movement assembly of the leakage current protection device, and does not need any external power source.

Referring to FIGS. 3-6, the illumination assembly further includes a sensing unit, a light emitting unit, and a light guide unit. The sensing unit is coupled to the illumination control board 6 and can sense the ambient environment outside of the shell. In the illustrated embodiment, the sensing unit includes a sensing element 61 coupled to the illumination control board 6. The sensing element 61 is a sensor configured to sense at least one of light signal, sound signal, wireless communication signal, and infrared signal and generate a sensing output signal accordingly. The sensing unit further includes a sensing post 61A which corresponds to the sensing element 61 and extends to the surface of the shell. In the illustrated embodiment, the sensing post 61A is a cover structure that covers the sensing element 61, and includes a protrusion that protrudes to the outer surface of the shell. Correspondingly, the shell has a sensing opening 13 (see FIG. 1) that allows the protrusion to protrude to the surface.

The light emitting unit 66 may be a light emitting diode (LED) or organic light emitting diode (OLED), or other suitable light emitting elements, and is coupled to the illumination control board 6. The illumination control board 6 controls the ON and OFF of the light emitting unit 66 in response to the sensing output signal from the sensing unit, so as to provide illumination under defined conditions.

In some embodiments, the sensing element 61 is a motion sensor (e.g., infrared transmitter or video camera), and can generate the sensing output signal based on proximity of a human body to the receptacle. This way, the illumination control board 6 can determine whether a human has entered a predefined sensing radius and control the ON and OFF state of the light emitting unit accordingly.

In some embodiments, the sensing element is a light sensor (e.g. a photoresistor), which can sense ambient brightness and generate corresponding sensing output signals. Based on the sensing output signals, the illumination control board determines whether the ambient brightness is above or below a predetermined threshold, and controls the operation of the light emitting unit accordingly. For example, when the ambient brightness is below the predetermined threshold, the illumination control board controls the light emitting unit to turn on. Optionally, the illumination control board controls the light emitting unit to turn on for a predetermined time period and then turn it off. When the ambient brightness is above the predetermined threshold, the illumination control board controls the light emitting unit to turn off. This way, the device can automatically turn on the illumination when ambient brightness is insufficient, avoiding waste of energy.

In some embodiments, the sensing element is a wireless communication device, which can receive remote control signals from a remote terminal via Bluetooth, Wi-Fi or other communication methods and generate corresponding sensing output signals. Based on the sensing output signals, the illumination control board controls the operation of the light emitting unit. The remote terminal may be a computer, smartphone, tablet computer, smart watch and other wearable devices, etc.

In some embodiments, the sensing element is a sound sensor, which can sense ambient sound volume and generate corresponding sensing output signals. Based on the sensing output signals, the illumination control board determines whether the ambient sound volume (decibel) is above or below a predetermined threshold, and controls the operation of the light emitting unit accordingly. For example, when the ambient sound volume is above the predetermined threshold, the illumination control board controls the light emitting unit to turn on. Optionally, the illumination control board controls the light emitting unit to turn on for a predetermined time period and then turn it off. When the ambient sound volume is below the predetermined threshold, the illumination control board controls the light emitting unit to turn off.

In some embodiments, the light emitting unit can provide at least one of the following illumination effects: monochrome lighting, multi-color lighting, continuous lighting, flashing lighting, flowing water lighting, breathing light lighting, etc. For example, in a relatively dark environment, too high a brightness can cause discomfort for users' eyes, so a relatively soft color light or breathing light may be used to lessen the discomfort.

It should be understood that the above described different types of sensing units and different types of light emitting units may be substituted and combined in any desired manner to meet users' needs.

According to embodiments of the present invention, the light guide unit is preferably formed by an operating element of the leakage current protection device disposed at the outer surface of the shell, and is located adjacent the light emitting unit 66, so as to transmit the light generated by the light emitting unit 66 to the outside of the shell. In the illustrated embodiment, the light guide unit is the test button 8 of the test assembly, and is located adjacent the light emitting unit 66 as shown in FIG. 2. This way, the light emitted by the light emitting unit is reflected by a large area reflector toward the outside of the shell, which provides a large illumination area and improves illumination effect. Further, because the light guide unit is integrated with the test button, it does not significantly change the exterior layout and size of the receptacle, so the receptacle can be used as in conventional applications.

It should be understood that the light guide unit may also be integrated with the reset button 7, by forming the reset button 7 from a light transmitting material, to provide the same illumination function described above. In some embodiments, the illumination control board 6 may include two light emitting units which respectively correspond to the reset button 7 and test button 8, so these two operating elements can both be used to provide illumination, or be used to achieve a more diversified illumination effect.

Figure 5:
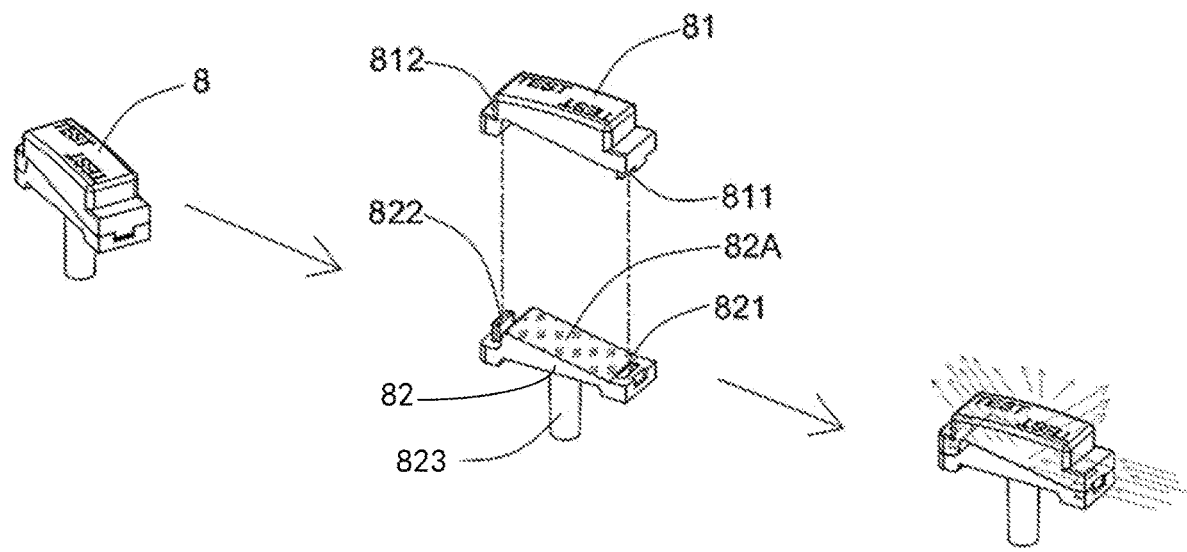
FIG. 5 is an exploded view of a light guide unit according to an embodiment of the present invention.
Figure 6:
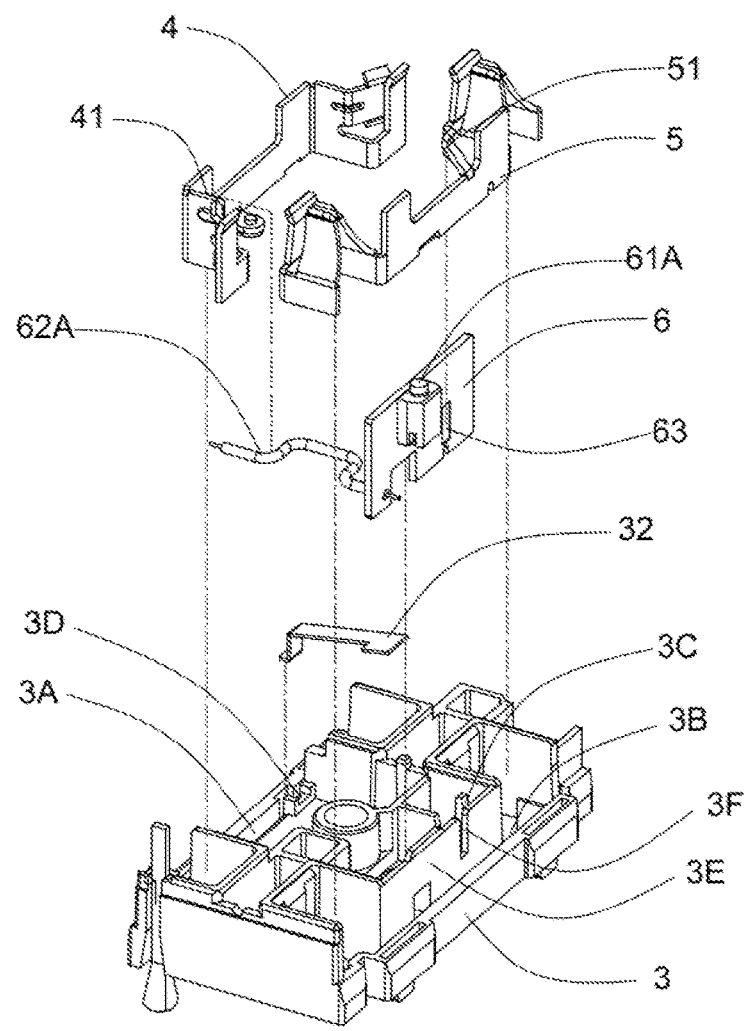
FIG. 6 is an exploded view showing the illumination assembly and the middle support frame and the socket plates.

In some embodiments, the test button has a structure similar to a conventional test buttons, except that the material is changed to achieve the illumination function. Preferably, the test button 8 may include a structure that enhances light reflection to improve illumination effect. In the embodiment shown in FIG. 5, the structure of the test button 8 includes a light transmitting key 81 and light reflecting platform 82. The light transmitting key 81 forms the operating portion of the button that partially protrudes out of the outer surface of the shell. The light reflecting platform 82 is joined to the light transmitting key 81 and has a test rod 823 which is configured to engage the test plate 32 of the test assembly when the test button is pressed down. At least the light transmitting key 81 is formed of a light-transmitting material, which may include any suitable transparent or semi-transparent materials. Optionally, the light reflecting platform 82 and light transmitting key 81 are joined to each other using a snap connection. For example, the light transmitting key 81 may include a snap 811 and snap slot 812 at its two ends respectively, and correspondingly, the light reflecting platform 82 may have a snap slot 821 and snap 822 at its two ends respectively. The corresponding snaps and snap slots engage each other to allow the light transmitting key 81 and light reflecting platform 82 to be removably attached to each other. This way, the light transmitting key 81 may be replaced with other light transmitting keys, for example, keys of different materials or colors, to obtain different illumination effects. In some embodiments, the light reflecting platform 82 has a diffuse-reflective inclined plane 82A; the inclined plane matches the shape of the light transmitting key 81, and faces the light emitting unit, i.e., facing the direction of the incident illumination light as shown in FIG. 5, so that it diffuse-reflects the illumination light through the light transmitting key 81, enhancing the illumination effect.

When the leakage current protection devices is in use, the sensing unit senses or detects the ambient environment of the receptacle and generates a sensing output signal; the illumination control board controls the ON or OFF of the light emitting unit in response to the sensing output signal. When the light emitting unit is turned ON, the light it emits is guided by the light guide unit (the diffuse-reflective inclined plane and the light transmitting key) to be transmitted to the outside of the shell to provide illumination, which makes it easier to plug electrical devices into the receptacle. By providing multiple different sensing units, the leakage current protection device can achieve multiple different modes of lighting control, such as light controlled, sound controlled, etc., providing more convenience to the user and making the device more intelligent and humanized. Further, because the illumination assembly is powered by the movement assembly, whether the illumination assembly can be turned on or off can provide a simple indication of whether the leakage current protection device is in a proper working condition.

It should be understood that the embodiments shown in the drawings only illustrate the main implementing units and components of the leakage current protection device and its illumination assembly. The shapes, sizes and spatial arrangements of the various components only illustrate the embodiments and are not limiting. Other shapes, sizes and spatial arrangements may be used without departing from the spirit of the invention. Further, the above descriptions of the operation are only exemplary and not limiting.

It will be apparent to those skilled in the art that various modification and variations can be made in the embodiments of the present invention without departing from the spirit or scope of the invention. Thus, it is intended that the present invention cover modifications and variations that come within the scope of the appended claims and their equivalents.

What is claimed is:

1. A leakage current protection device with an illumination function, comprising:
    a shell;
    a movement assembly disposed in the shell;
    a power input assembly and a power output assembly coupled to the movement assembly; and
    an illumination assembly disposed inside the shell, including:
        an illumination control board, electrically coupled to the power input assembly or the power output assembly;
        a sensing unit, coupled to the illumination control board, and configured to sense an ambient condition outside of the shell to generate a sensing output signal;
        a light emitting unit, coupled to the illumination control board, wherein the illumination control board is configured to control the light emitting unit to turn on or off in response to the sensing output signal from the sensing unit; and
        a light guide unit, which is formed by an operating element partially protruding out of the shell and disposed adjacent the light emitting unit, configured to guide an illumination light emitted by the light emitting unit out of the shell.

2. The leakage current protection device of claim 1, further comprising a reset assembly and a test assembly, wherein the operating element forming the light guide unit is a button of the reset assembly or the test assembly which partially protrudes out of the shell.

3. The leakage current protection device of claim 2, wherein the light guide unit is a test button of the test assembly, the test button including:
    a light transmitting key, which partially protrudes out of the shell to form an operating portion of the test button;
    a light reflecting platform, joined to the light transmitting key and including a test rod which is configured to engage a test plate of the test assembly,
    wherein at least the light transmitting key is formed of a light transmitting material.

4. The leakage current protection device of claim 3, wherein the light reflecting platform includes a diffuse-reflective inclined plane, wherein the inclined plane matches a shape of the light transmitting key and faces the light emitting unit, configured to diffuse-reflect the illumination light from the light emitting unit through the light transmitting key.

5. The leakage current protection device of claim 1, wherein the sensing unit includes a sensor coupled to the illumination control board, wherein the sensor is configured to sense at least one of a light signal, a sound signal, a wireless communication signal, and an infrared signal and generate a sensing output signal accordingly.

6. The leakage current protection device of claim 5, wherein the sensing unit further includes a sensing post which corresponds to the sensor and extends to an outer surface of the shell, wherein the shell includes a sensing opening and wherein the sensing post partially protrudes from the sensing opening.

7. The leakage current protection device of claim 1, wherein the leakage current protection device is a power receptable and includes a middle support frame, wherein the illumination control board is disposed on the middle support frame and electrically coupled to socket plates of the power output assembly.

8. The leakage current protection device of claim 7, wherein the socket plates include a hot socket plate and a neutral socket plate, the hot socket plate having a connection hole, the neutral socket plate having a power source contact plate, wherein the illumination control board includes another connection hole and a connection wire that connects the connection hole of the illumination control board to the connection hole of the hot socket plate, and wherein the illumination control board further includes a power source contact plate which contacts the power source contact plate of the neutral socket plate.

9. The leakage current protection device of claim 8, further comprising an isolation structure configured to isolate the illumination control board from the neutral socket plate, wherein the isolation structure includes an opening configured to allow the power source contact plate of the illumination control board and the power source contact plate of the neutral socket plate to physically contact each other.

\* \* \* \* \*